United States Patent [19]

Pas

[11] Patent Number: 4,670,329

[45] Date of Patent: Jun. 2, 1987

[54] METHOD AND COMPOSITE ARTICLE FOR CLEANING MOLDS

[76] Inventor: René J. T. M. Pas, Kapellenberglaan 44-6891 AG, Rozendaal (Gld), Netherlands

[21] Appl. No.: 809,014

[22] Filed: Dec. 13, 1985

[51] Int. Cl.⁴ .................. B32B 5/24; B32B 27/02; B32B 27/42
[52] U.S. Cl. .................................. 428/283; 264/39; 428/287; 428/288
[58] Field of Search ............... 264/39; 428/283, 287, 428/288

[56] References Cited

U.S. PATENT DOCUMENTS 2,346,228  4/1944  Merrill et al. .................. 264/39
4,425,288  1/1984  Tieszen et al. .................. 264/39

FOREIGN PATENT DOCUMENTS

788    1/1977  Japan .
48007  7/1980  Japan .
48009  9/1980  Japan .
48401  1/1984  Japan .

Primary Examiner—James C. Cannon
Attorney, Agent, or Firm—Herbert E. Haynes, Jr.

[57] ABSTRACT

A moldable compound of the type which has the inherent capability of cleaning contaminating stains and residues in compression, transfer and similar molds, is deposited on a carrier sheet to form an uncured mat for placement in a mold to be cleaned. When placed in a mold to be cleaned and subjected to a molding operation, the moldable compound coating of the uncured mat will melt and flow into conformity with the interior configuration of the mold and cure in that conforming configuration. The cured mat is then capable of being ejected in as a reinforced unitary structure from the mold.

31 Claims, 9 Drawing Figures

METHOD AND COMPOSITE ARTICLE FOR CLEANING MOLDS

BACKGROUND OF THE INVENTION

1. Field of the Invention

This invention relates in general to equipment cleaning and more particularly to a method and composite article for cleaning synthetic resins stains and residue out of the molds used in molding usable products from such materials.

2. Description of the Prior Art

The uses of compression molds, transfer molds or any other type of molds having a platen for forming useful products out of thermohardening compounds, such as epoxies, is a comparatively old and well developed technology. As is the case with most equipment, molds must be periodically cleaned and this is a tedious and time consuming task due to the complex configurations of many of todays molds. For a complete understanding of the problems associated with mold cleaning, a discussion will now be presented of a particular type of mold commonly used in forming semi-conductor products.

In the manufacture of integrated circuit packages, a plurality of the discreet integrated circuit chips are bonded in an aligned spaced side-by-side relationship on a thin metallic strip commonly referred to as a "leadframe". Such leadframes, usually two, are placed in spaced parallel positions on the bottom mold of a heated transfer-type mold set and a top mold of the set is moved downwardly into a precisely registered position atop the bottom mold and the two molds are clamped together. The bottom mold is provided with a centrally aligned row of material receiving cavities each of which has a plurality of channels, which are referred to as "runners", extending therefrom into communication with a similar number of upwardly opening recesses of the bottom mold. The top mold is formed with downwardly opening recesses which cooperate with the recesses of the bottom mold so as to enclose each of the discreet integrate circuit chips in its own chamber. The top mold is formed with plural vertical bores therein each of which aligns with a different one of the centrally located material receiving cavities of the bottom mold and a plunger is demountably and slidably mounted in each of the bores.

To accomplish a molding operation, the plungers are removed from the vertical bores of the top mold and the epoxy resin material, usually in pellet form, is dropped down through the bores into the material receiving cavities of the bottom mold. The plungers are reinserted into the bore of the top mold and a downwardly directed force is exerted thereon. The pressure exerted by the plungers along with heat from the molds will turn the epoxy resin pellets into a molten state causing the molten material to flow through the runners into the chambers of the mold. When this occurs, the molten resin starts to cure and a short time later, each of the discreet integrated circuit chips will be encapsulated in a solidified package which is shaped in accordance with the configuration of the chamber in which it was located prior to commencement of the encapsulating process.

When the curing step is completed, the bottom and top molds are separated and ejector pin mechanisms provided in both of the molds are operated to eject the leadframes from the molds. The leadframes are then subjected to further processing including cull removal, package separation from the leadframes trimming and the like.

As in all production operations, the above product encapsulation steps are repeatedly accomplished and, as hereinbefore mentioned, the molds must be cleaned periodically, sometimes as often as two or three times in an eight hour shift.

After each molding operation, or "shot" as it is commonly referred to in the art, some epoxy residue is left behind in the molds and produces staining of the molds. If the molds are not cleaned at proper intervals, mold staining causes an unacceptable finish on the molded products. The unacceptable finish typically appears in the form of cloudy spots on the finished products, that is, on the exterior surfaces of the integrated circuit packages of the above presented example. In addition to the need for cleaning the molds to remove stains, in some instances, flashing residues will build up on the parting surfaces of the two mold halves due to inaccuracies of the molds per se, varying thicknesses of the leadframes, and the like.

In the molding industries in general, and in the semiconductor arts in particular, there are basically four prior art mold cleaning techniques currently being used. Three of these prior art techniques utilize especially formulated melamine molding compounds which have an inherent affinity for the epoxy residues left behind in molding operations and thus are used to clean the molds.

In a first one of these prior art mold cleaning techniques, a compression grade of melamine molding compound in powder form is sprinkled on the bottom mold so that the parting surface of the mold is covered with as even a layer as is possible. The mold is then closed, e.g. the top mold is placed atop the bottom mold, and they are clamped together with a force which is considerably less than that applied during a normal production use. The molds, which remain heated during the cleaning operation, along with the compressive forces will cause the powdered melamine compound to melt and flow into conformity with the interior configuration of the mold set and subsequently cure. When the curing operation is completed, the molds are opened and the ejector pin system is operated to eject the molded layer from the parting surfaces, cavities, runners, and other recessed surfaces of the molds. However, there is no guarantee that the molded layer will be ejected in a single piece and, in fact single piece ejection very seldom occurs. This is due to spillage of the powered melamine, prior to molding, into the multiple holes and the various recessed portions of the mold surfaces and due the ejector pins not being provided in all of the holes, cavities and other recessed surfaces of the molds. Therefore, the cured melamine layer will break into pieces with many pieces remaining in the mold. Very often, the remaining pieces of the cured melamine will need to be chiseled out by a special tool made of soft material so as not to damage the molds. In addition, mold damage can result from excessive amounts and/or uneven distribution of the powdered melamine at the beginning of the cleaning operation, and the subsequent application of clamping forces. In such instances, the molds can shift which results in mis-alignment and possible mold breakage. Another problem with this first mold cleaning technique is that when the powdered melamine is sprinkled onto the hot base mold it will immediately begin to melt and thus start to cure before the molds set is closed and clamped together. This causes a reduction in the mold cleaning capabilities of the melamine compound. In order to minimize this premature melting and curing problem, sometimes the mold set is intentionally allowed to cool down somewhat from its normal production temperature. This, while not completely eliminating the premature melting and curing problem, will minimize the problem, but the lowered mold temperature significantly increases the cure time of the melamine and thus slows down the cleaning operation.

The above described mold cleaning operation is normally repeated several times, usually between three and six times, until the mold set is completely cleaned. In that the cured melamine usually breaks into a plurality of pieces some of which need to be chiseled out of the mold, it is difficult, if not impossible, to inspect the cured melamine for determining when the mold cleaning operation is completed. Therefore, it is necessary that the mold set itself be visually inspected, as opposed to inspecting the cured meelamine and this is difficult due to the multiplicity of cavities, runner and other surfaces of the mold. Also, due to spillage of the powdered melamine, and breakage of the cured melamine, inspection of the cured melamine, rather than inspection of the molds themselves, for proper ejector pin retraction is impossible.

The second mold cleaning technique sometimes used is commonly referred to as the "preform" method. In this technique, the melamine is compressed or otherwise formed into solids which are placed on the bottom mold surfaces. The heat and the compressive forces applied by the mold set will melt the preforms and cause the molten melamine to spread out on the parting surfaces of the molds ad flow into the cavities, runners and other recessed surfaces of the molds. The use of preforms provides an improved even coating of the parting surfaces of the molds in comparison to the above described powdered melamine technique. However, breakage of the cured melamine upon removal from the mold, the need for chiseling, visual inspection, and the other control problems associated with the aforesaid first technique are about the same for this second, or preform, method.

A third prior art mold cleaning technique is sometimes used and this technique utilizes a different grade of melamine molding compound of the type suitable for transfer molding operations. The transfer melamine molding compound is placed in the mold set in exactly the same way that the epoxy molding compound is placed therein and the cleaning procedure is exactly the same as an epoxy molding, or production, operation. This transfer type mold cleaning technique is not nearly as efficient in so far as its mold cleaning capabilities as the hereinbefore described compression cleaning operations. In that the transfer mold cleaning technique is accomplished with full clamping forces being applied to the mold set, the transfer grade melamine will not reach the parting surfaces of the mold set and therefore cannot clean those surfaces. In that the mold cleaning technique is used in a normal transfer molding manner, it must be accomplished with dummy leadframes in the molds. Also, the transfer grade melamine molding compound has a viscosity which often blocks, or otherwise interferes, with moving mold components such as ejector pins, floating cavities and the like. Also, the transfer melamine molding compound cleaning technique needs to be combined with some other cleaning procedure in order to clean the parting surfaces of the mold halves.

The fourth prior art method for cleaning molds is accomplished by cooking the contaminated parts of a disassembled mold set in a suitable detergent such as N-Pyrol. This technique is, of course, unacceptable except possibly at the end of a production run, in that it takes the mold out of service for an excessively long period of time.

Therefore, a need exists for a new and improved article and method for cleaning molds which overcomes some of the problems and shortcommings of the prior art.

SUMMARY OF THE INVENTION

In accordance with the present invention, a new and useful composite article and method is disclosed for cleaning synthetic resin stains and residue out of the molds used in fabricating usable products from such resins. The new article and method has been found to be useful in cleaning transfer molds, compression molds and any other types of molds having platens.

The composite article of the present invention includes a carrier sheet which is coated with a mold cleaning moldable compound to form what will hereinafter be referred to as an uncured mat. The carrier sheet is in the form of a sheet of synthetic resin such as polyester which is approximately 3 mm thick in an uncompressed state, and is otherwise sized so as to approximately match the parting surfaces of the mold set to be cleaned. The mold cleaning moldable compound, such as the hereinbefore discussed melamine, is mixed with water to form an emulsion, or slurry, of about 50% melamine and 50% water. The carrier sheet is passed through, dipped, or otherwise emersed in the molding compound slurry to provide the desired coating thereon. It has been found that the slurry formed as described above will adhere to the carrier sheet and when a suitable coating has been deposited thereon, it is passed through rollers so that the coating will be of uniformly conistent thickness. The carrier sheet with the mold cleaning moldable compound thereon is then subjected to a suitable drying process such as by using relatively hot air and gradually lowering the temperature of the drying air. When dried, the article, which is referred to as the uncured mat, as mentioned above, is ready for use in the mold cleaning process of the present invention.

With the mold set that is to be cleaned in a separated state, e.g. the top mold lifted off of the bottom mold, the uncured mat is placed on the parting surface of the bottom mold. The top mold is then lowered back onto the bottom mold and they are clamped together with a reduced clamping force in comparison to the clamping force normally used thereon in a production molding operation. The combination of the heat from the molds and the compressive forces will cause the mold cleaning moldable compound to melt and flow into the various cavities, runners and other recesses of the mold set and a relatively thin layer will remain in engagement with the parting surfaces of the mold set. When the mold cleaning moldable compound is cured, the mold halves are separated and the ejector pin system of the mold set is operated to eject the cured mat from the mold set. The cured mold cleaning compound has a greater affinity for the carrier sheet than it does for the mold surfaces and this, along with the supporting and rigidifying effect provided by the embedded carrier sheet, results in the cured mat being easily and completely ejected from the molds as a unitary structure.

The above described composite article and method of the present invention has been found to substantially reduce the time and labor heretofore needed to clean molds for several reasons. First, the present invention provides a highly simplified means for placing the mold cleaning moldable compound in the mold set to be cleaned. For example, it is far simpler to lay the uncured mat on the base mold than it is to sprinkle the powdered compound thereon and there is no spillage or uneven distribution of the compound when the uncured mat is used. Secondly, since the cured mat is ejected from the mold set as an unbroken unitary piece, the prior art problem of having to chisel out non-ejected molded bits and pieces is eliminated. Thirdly, since the cured mat comes out of the mold in one piece, it can be easily inspected visually for evidence of mold damage, incompletely retracted ejector pins and the like. Fourth, mold cleanliness is easily determined by visual inspection of the cured mat in that removed mold stains and residues clearly show on the various surfaces of the cured mat. And, fifth, the prior art problem of premature melting and curing of the mold cleaning compound is eliminated, or at least substantially reduced. This is due to the much faster loading time of the uncured mat and, more importantly, due to the heat absorbing, or insulating, properties of the carrier sheet per se.

Accordingly, it is an object of the present invention to provide a new and useful composite article for use in cleaning resin stains and residues from the molds used in fabricating molded products from the resins.

Another object of the present invention is to provide a composite article of the above described character which provides simplified and rapid loading of a mold cleaning moldable compound into a mold set to be cleaned, improved compound flow and mold surface conformity during a mold set cleaning operation and simplified, rapid and complete ejection from the mold set at the end of the mold set cleaning operation.

Another object of the present invention is to provide a new and improved composite article of the above described character wherein the article includes a carrier sheet which is evenly coated with or embedded in a mold cleaning moldable compound to form an uncured mat which provides the simplified loading of the mold set to be cleaned and the improved compound flow and mold conformity characteristics during the cleaning operation, and provides a rigidified cured mat subsequent to the cleaning operation which is easily ejected as a unitary structure and is simple to visually inspect for mold damage and cleanliness.

Another object of the present invention is to provide a new and improved method for cleaning resin stains and residues from the molds used in fabricating molded products from the resins.

Another object of the present invention is to provide a new and improved method of the above described character which includes forming of the uncured mat as described above, inserting the uncured mat between the parting surfaces of the hot mold set to be cleaned, clamping the mold set together with a clamping force which is of reduced force in comparison to that normally used in a production molding operation, curing the mold cleaning moldable compound in the mold set, ejecting the cured mat as a rigidified cured mat from the mold set being cleaned and visually inspecting the cured mat for mold damage and mold cleanliness.

The foregoing and other objects of the present invention as well as the invention itself may be more fully understood from the following description when read in conjunction with the accompanying drawings.

DESCRIPTION OF THE PREFERRED EMBODIMENT

Figure 3:
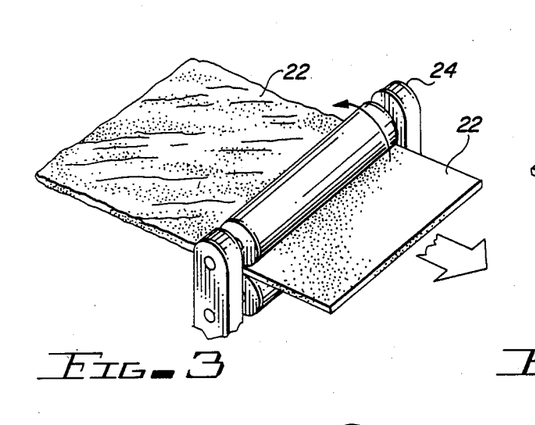
FIG. 3 is a diagrammatic perspective view of another step of the method of the present invention wherein the coated carrier sheet is passed through a suitable sizing device to provide a uniformly thick coating of the mold cleaning moldable compound on the carrier sheet.
Figure 4:
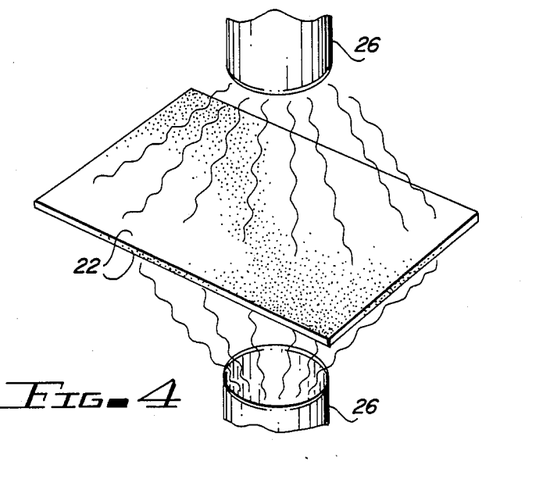
FIG. 4 is a diagrammatic perspective view of a further step of the method of the present invention wherein the coated carrier sheet of uniform thickness is dried to complete the fabrication of the composite article of the present invention.
Figure 5:
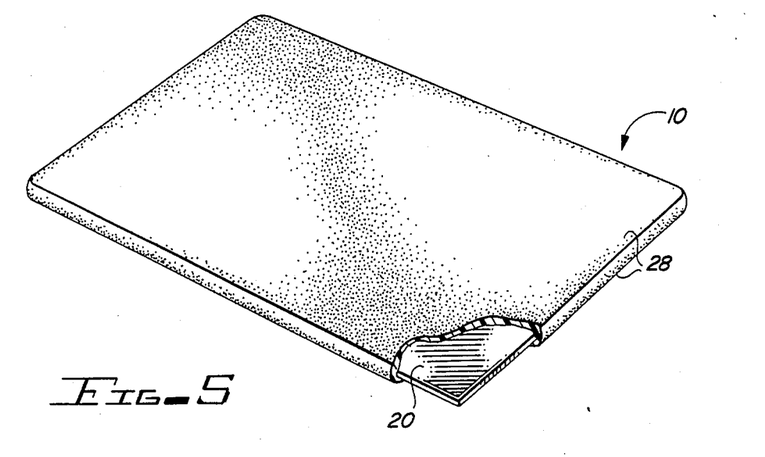
FIG. 5 is an enlarged perspective view of the composite article of the present invention with a portion thereof being broken away to show the various features thereof.

Referring more particularly to the drawings, FIGS. 1-4 illustrate the various steps for making the composite article of the present invention, with the article being best shown in FIG. 5 wherein it is identified in its entirety by the reference numeral 10.

Figure 1:
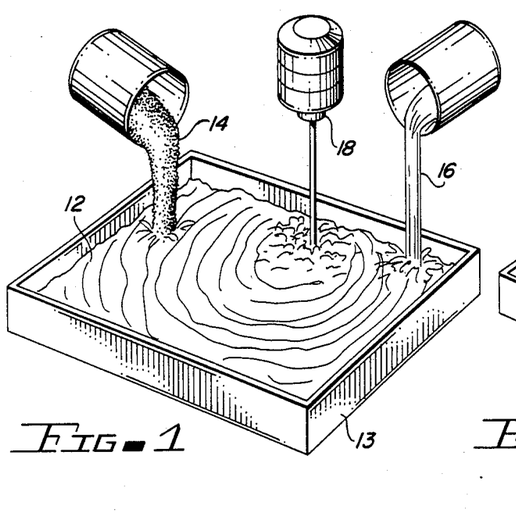
FIG. 1 is a diagramamtic perspective view showing the first step of the method of the present invention wherein an emulsion is formed of a mold cleaning moldable compound and an aqueous liquid.

FIG. 1 shows the first step for manufacturing the composite article 10 as being the mixing of a slurry 12, or emulsion, in a suitable container 13. The slurry 12 is a mixture of approximately 50% mold cleaning moldable compound 14 and an aqueous liquid, or water 16. It is to be understood that the mixture ratio presented above is juxt a suggested ratio which has been found to be quite satisfactory, but the ratio may be varied as desired. A suitable agitation device 18 is used to accomplish the initial mixing and to maintain the desired emulsified state of the slurry.

As is well known in the art, some synthetic resin molding materials, such as for example, epoxy resin, will stain or otherwise leave residues in the molds use in forming such materials into usable products. Other synthetic resin molding material will not stain or leave residues in the molds and will, in fact, actually clean the molds by being subjected to a molding operation in molds which are contaminated as a result of previous molding operations. This latter general type of synthetic resin molding material is the type used in forming the composite article 10, and such resins are generally referred to herein as "mold cleaning moldable compounds". A particular mold cleaning moldable compound in general use for this purpose is a compression grade of melamine known as Polyset compound 158/92 available from Morton Chemical, 1275 Lake Avenue, Woodstock, Illinois, 60098, a division of Morton Thiokol, Inc. The Polyset compound 158/92 is a rapid curing, non-abrasive cellulose filled, amino molding compound which is ideal for use in the formation of the composite article 10 and for use in the method of the present invention. Compound 158/92 is available in a granulated, or powdered, form and is also available in a light color, such as white, for easy visual recognition of stain removal. Therefore, Compound 158/92, in this particular form, is the preferred mold cleaning moldable compound 14 which is used to accomplish the above described first step of the method of the present invention.

The next step of the instant method is to cut or otherwise form a carrier sheet 20 to a predetermined size, as determined by the molds to be cleaned, as will hereinafter be described in detail.

Figure 2:
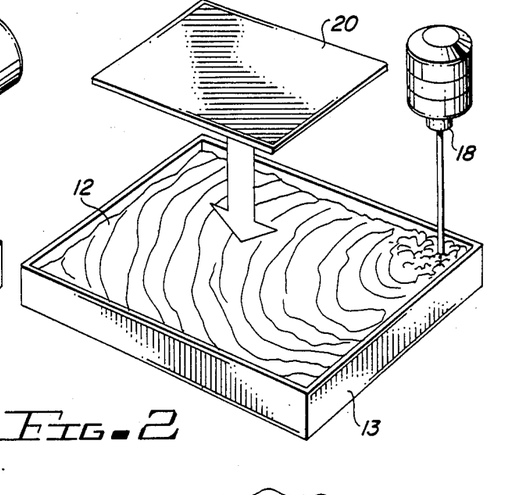
FIG. 2 is a diagrammatic perspective view showing a subsequent step of the method of the present invention wherein a carrier sheet is emersed in the emulsion for coating purposes.

The carrier sheet 20 is then dipped or otherwise emersed in the slurry 12, as indicated in FIG. 2 so as to impregnate or otherwise deposit a slurry coating 22 on all of the surfaces of the carrier sheet 20.

It is preferred that the carrier sheet 20 be formed of a suitable resin, such as polyester, to provide a nonwoven carrier sheet having fabric, or cloth-like characteristics. It has been found that when the carrier sheet 20 is formed of such materials and has the above mentioned charactristics, the mold cleaning moldable compound 14 will adhere to the carrier sheet 20, and the sheet is otherwise ideally suited for the intended purpose as will hereinafter be discussed. Further, it has been found that the carrier sheet 20 having an approximate thickness of 3 mm in the uncompressed state work well in most, if not all mold cleaning operations.

When the carrier sheet 20 has been provided with the slurry coating 22 in the above described manner, it is then passed through or otherwise treated, in a suitable sizing device 24 such as the rollers shown in FIG. 3. The sizing device 24 is employed to level, screed, or otherwise provide the slurry coating 22 with a uniform thickness on the opposed planar surfaces of the carrier sheet 20.

The thickness of the slurry coating 22 upon completion of the above described sizing step, is predetermined in accordance with the molds to be cleaned. In other words, the number and size of the various cavities, runners, gates and other recesses of the molds will determine how much of the mold cleaning moldable compound 14 will be needed to properly clean the mold.

The final step in fabricating the composite article 10 is that of drying the slurry coating 22 and the carrier sheet 20 and that may be accomplished in any number of well known ways. For example, air may be directed from suitable nozzles 26 onto the slurry coating 22 and the encapsulated carrier sheet 20, as indicated in FIG. 4. When air drying in this manner is used, it is preferred that relatively warm air is used at the initial stages of the drying process with the air temperature being gradually lowered as the drying operation progresses.

When the drying step is completed, the composite article 10 is ready for use in a mold cleaning operation. It will be apparent as this description progresses that the composite article 10 will undergo some changes during the mold cleaning process to be hereinafter described. Therefore, for descriptive purposes, the composite article 10 prior to its being used for mold cleaning purposes will hereinafter be referred to as an uncured mat 10.

As best seen in FIG. 5, the uncured mat 10 is a relatively smooth planar structure having the carrier sheet 20 incapsulated in the dried coating 28 of the mold cleaning moldable compound 14.

Figure 6:
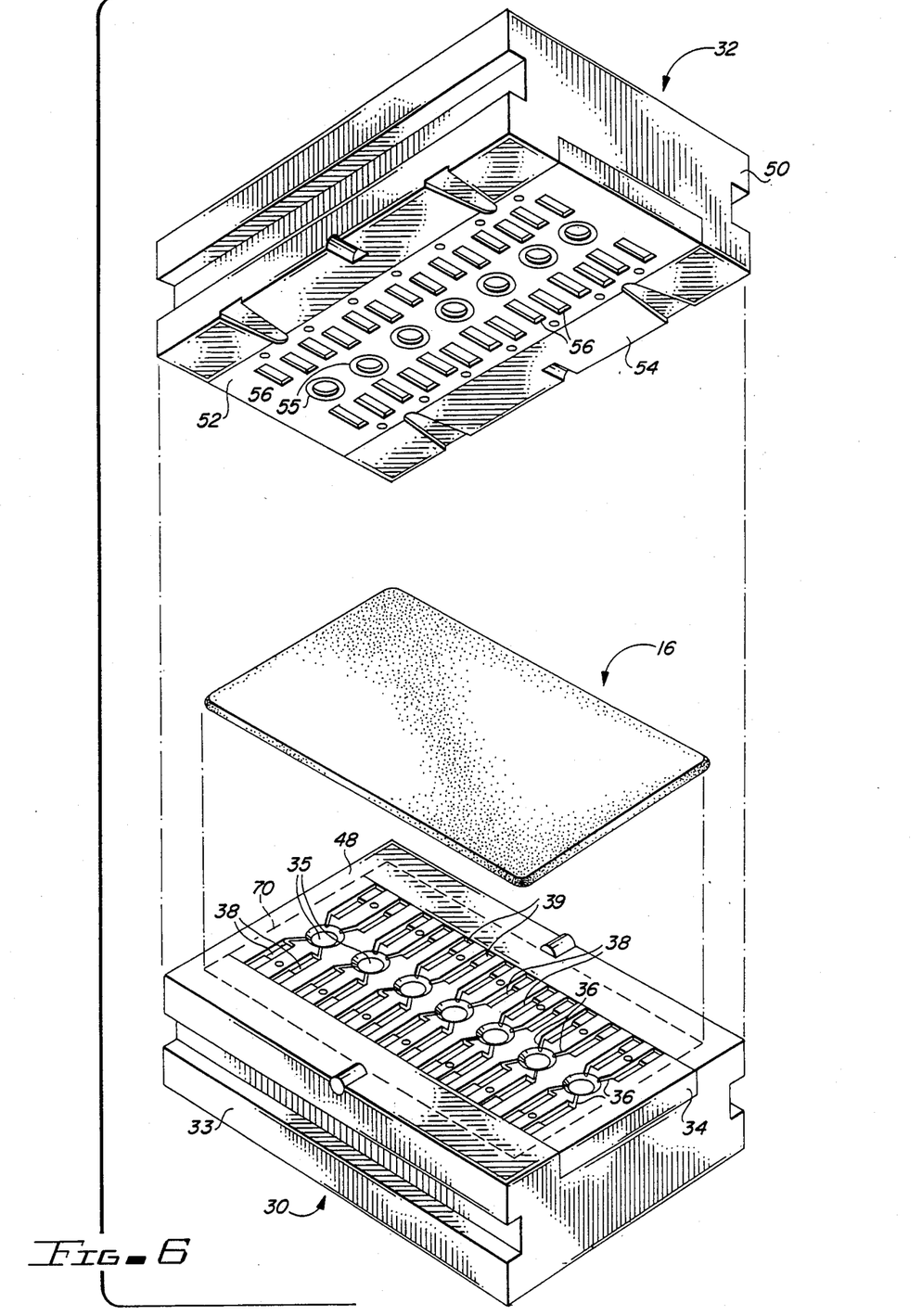
FIG. 6 is an explosed view of a typical mold set of the type which may be cleaned by employing the composite article and method of the present invention, this view also shows the composite article in exploded relationship with the mold set.
Figure 7:
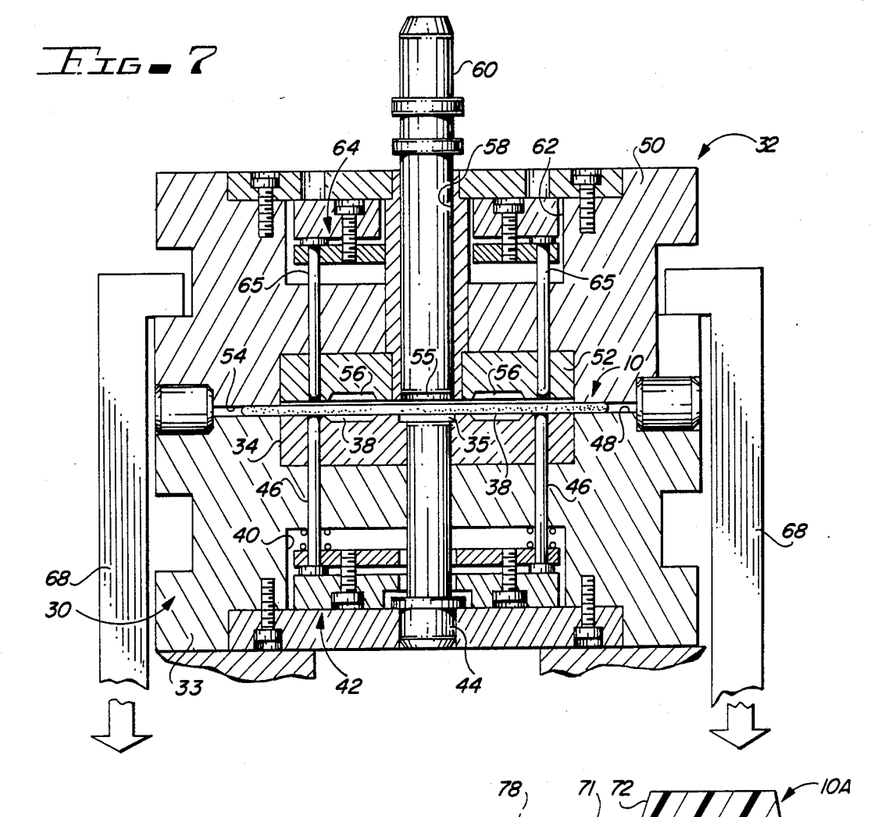
FIG. 7 is a transverse sectional view of the assembled mold set shown in FIG. 6 with the composite article being shown in the installed position thereof.

As hereinbefore mentioned, the uncured mat 10 can be used in various types of molds such as compression molds, transfer molds and any other platen-type mold. To insure a clear understanding of the method for cleaning molds of the present invention, a typical transfer type mold set is shown in FIGS. 6 and 7 and will now be described.

The illustrated mold set includes a bottom mold 30 and a top mold 32 which are specifically designed to accomplish an encapsulating process wherein integrated circuit chips (not shown) are encapsulated in suitable packages. As is well known in the art, a plurality of discreet integrated circuit chips (not shown) are bonded in an aligned spaced side-by-side relationship on an elongated thin metallic strip (not shown) which is commonly referred to as a "leadframe". The bottom and top molds 30 and 32 are designed to receive two such leadframes and accomplish encapsulation of the plural chips mounted thereon.

The bottom mold 30 includes a mold base 33 having a bottom die 34 mounted in the upper surface thereof in a manner well known in the art. The die 24 is machined or otherwise formed to define a centrally aligned row of material receiving cavities 35 each having runners 36 extending therefrom into communication with the inside edges of four different upwardly opening recesses 38. The recesses 38 lie in longitudinally extending rows on opposite sides of the central cavities 35 and each recess 38 has a vent passage 39 extending from its opposite edge.

A chamber 40 is formed in the mold base 33 below the die 34 and an ejector mechanism 42 is located therein. The ejector mechanism 42 operates in a manner well known in the art to eject completed products from the bottom mold upon completion of each molding cycle. For that purpose, the ejector mechanism 42 includes a plurality of centrally located ejector pins 44 (one shown), with there being one of such centrally located ejector pins 44 for each of the material receiving cavities 35. The ejector mechanism 42 further includes a plurality of auxiliary ejector pins 46, a pair of which is located on opposite sides of each of the centrally located ejector pins 44. As shown, the centrally located ejector pins 44 extend upwardly through the die 34 and provide the bottoms of their respective ones of the material receiving cavities 35. The auxiliary ejector pins 46 extend upwardly through the die 34 and have the uppermost ends flush with the top surface of the die. The top surface of the die 34, and the laterally disposed top surfaces of the mold base 33 which are flush with the top surface of the die, cooperatively form what is commonly referred to as the parting surface 48 of the bottom mold.

When the above described ejector mechanism 42 is operated from its illustrated retracted position to its ejection position, the central ejector pins 44 will move up in the central cavities 35 and the auxiliary ejector pins 46 will simultaneously move up therewith so that their top ends will extend above the parting surface 48 of the bottom mold 30.

The top mold 32 is provided with a mold base 50 having an upper die 52 mounted in the lower surface thereof. The downwardly facing surface of the upper die 52 and the laterally disposed surfaces of the mold base 50, cooperatively form the parting surface 54 of the top mold 32. The upper die 52 is formed with a centrally extending row of openings 55 each of which is disposed to align with a different one of the material receiving cavities 35 of the bottom mold 30 when the top mold 32 and bottom mold 30 are in the closed position as shown in FIG. 7. The upper die 52 is also formed with a plurality of downwardly opening recesses 56 which lie in rows on opposite sides of the openings 55 thereof. Each of the recesses 56 aligns with a different one of the recesses 38 of the bottom mold 30 when the molds are closed as in FIG. 7.

As shown in FIG. 7, each of the openings 55 (one shown in FIG. 7) is defined by the lower end of a bore 58 that is formed through the top mold 32, and a plunger 60 is demountably and slidable mounted in the bore.

A chamber 62 is formed in the mold base 50 above the die 52 and an ejector mechanism 64 is provided in the chamber. The mechanism 64 includes two spaced apart rows of ejector pins 65 (two shown) which extend down through the mold base 50 and the upper die 52 so that the depending ends of these ejector pins 65 are flush with the parting surface 54 of the top mold 32 in the illustrated retracted position thereof. As in the case of the ejector mechanism 42 of the bottom mold 30, the ejector mechanism 64 of the top mold 32 is moved to an extended position to eject molded products from the top mold.

In a conventional molding operation, a pair of the hereinbefore discussed leadframes (not shown) are placed in a side-by-side relationship on the parting surface 48 of the bottom mold 30 so that they overlay different ones of the rows of recesses 38 thereof which each of the discreet integrated circuit chips (not shown) being located over a different one of those recesses. The top mold 32 is then placed atop the bottom mold 30 so that each of the circuit chips (not shown) will lie in the space defined by different aligned recesses 38 and 56 of the bottom and top molds respectively.

When so assembled, the bottom and top mold 30 and 32 are clamped together by any suitable means as indicated at 68 in FIG. 7. The hereinbefore mentioned plungers 60 are extracted from the top mold 32 and the epoxy molding compound, usually in pellet form (not shown) are dropped through the top mold into each of the material receiving central cavities 35 of the bottom mold 30. The plungers 60 are then reinserted and a downwardly force is applied to the plungers 60. This force in addition to the heat of the molds changes the state of the epoxy molding compound from a solid to a molten state, and the force applied by the plungers 60 causes the molten epoxy to flow from the cavities 35 through the runners 36 into the spaces defined by the recesses 38 and 56 of the bottom and top molds. upon curing, the molten epoxy materials return to the solid state and the encapsulated products (not shown) are ejected in the previously described manner form the opened, or separated mold halves.

The above described molding cycle is repeated on an ongoing production basis and the molds need to be periodically cleaned as hereinbefore discussed. To accomplish the mold cleaning method of the present invention, the uncured mat 10 is placed on the parting surface 48 of the bottom mold 30. As previously mentioned, the carrier sheet 20 is cut into a predetermined size suitable for use in the particular mold set to be cleaned. In the illustrated example, the carrier sheet 20 is cut so that it completely overlays the upper surface of the lower die 34 such as is indicated in dashed lines at 70 in FIG. 6.

The top mold 32 is then placed atop the bottom mold 30 so that the uncured mat 10 is interposed between the parting surfaces 48 and 54 of the bottom and top molds 30 and 32 respectively, as indicated in FIG. 7. When assembled in this manner, the molds are clamped together, such as by operation of the clamping means 68 with the clamping force being of reduced value in comparison with the forces applied during a conventional molding operation.

As is the case in conventional molding operations, the heat of the molds will change the dried coatings 28 on the uncured mat 10 into a molten state and the molten mold cleaning moldable compound will flow into the various cavities, runners and other recesses of the molds 30 and 32 as a result of the compressive forces applied thereon by the clamped together molds. It is to be understood that not all of the molten compound will be squeezed into the various recesses and cavities of the molds. Some of that compound will stay in place on the carrier sheet 20 for cleaning of the parting surfaces 48 and 54 of the molds.

Figures 8, 9:
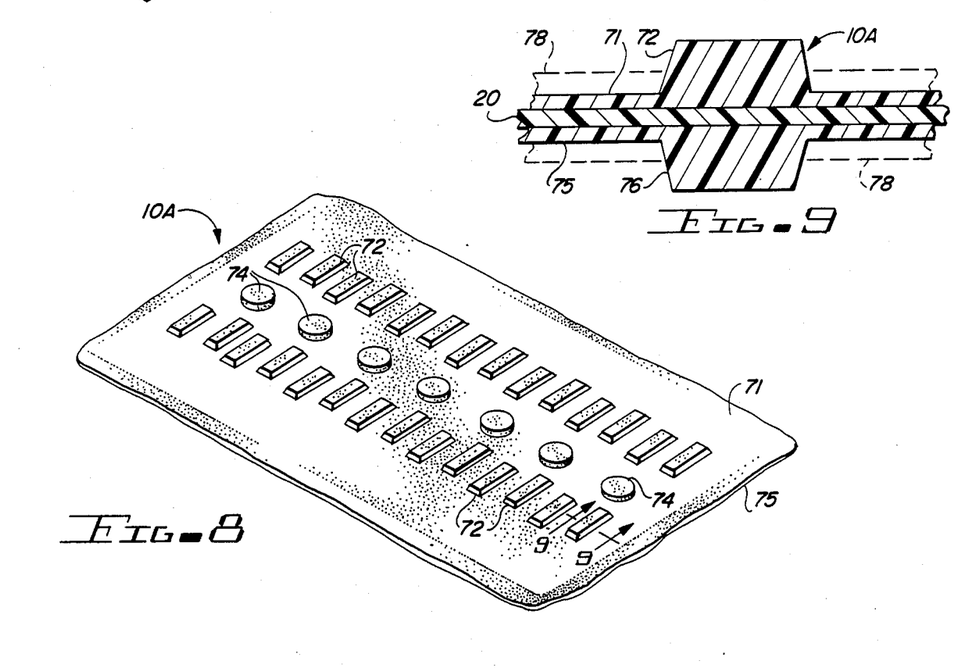
FIG. 8 is a perspective view of the composite article showing the appearance thereof subsequent to the curing of the mold cleaning moldable compound during the mold set cleaning operation.
FIG. 9 is an enlarged fragmentary sectional view taken along the line 9—9 of FIG. 8.

When the mold cleaning moldable compound cures, it will return to the solid state and is then ready to be ejected from the molds much in the same manner as the hereinbefore discussed ejection of molded products of a production operation. When this is to be accomplished, the molds are unclamped and the molds are opened and the ejector mechanisms 42 and 64 of the bottom and top molds 30 and 32 are operated. When this takes place, the composite article, which has now been changed into what may be referred to as the "cured" mat 10A. the cured mat 10A, as seen in FIGS. 8 and 9, is now a rigidified structure which is reinforced against breakage by virtue of the carrier sheet 20 embedded therein.

The cured mat 10A is an exact but reversed image of the mold set in which it was cured. In otherwords, the upper surface 71 of the cured mat 10A has block shaped protrusions 72 at each location where the molten compound flowed into the recesses 56 of the top mold 32 and substantially cylindrical protrusions 74 in the areas of the openings 55 of the top mold. The opposite surface 75 of the cured mat 10A is similarly provided with appropriately shaped protrusions, such as the block shaped protrusion 76 shown in FIG. 9. The other protrusions (not shown) on the opposite surface 75 of the cured mat 10A will match the configurations of the centrally located row of material receiving cavities 35, runners 36, and vent passages 39 of the bottom mold 30.

As hereinbefore mentioned, the molten molding compound 14 will be squeezed between the parting surfaces of the mold halves. The original thickness, e.g. prior to squeezing, of the uncured molding material is indicated in dashed lines 78 in FIG. 9. Due to the squeezing, the areas of the cured mat 10A which do not overlay the various recesses and cavities of the bottom mold or underlay the various recesses and cavities of the top mold during the above described mold cleaning operation, will be of reduced thickness and will clean the parting surfaces 48 and 54 of the molds and the various protrusions will clean the recesses, cavities and other recessed surfaces of the molds.

In that the mold cleaning moldable compound 14 has a natural affinity for the stains and residues left in the molds by production molding operations, the stains and residues cleaned out of the molds by the above described method will be disposed on the surfaces of the cured mat 10A. Therefore, the removed stains and residues will be readily apparent on the surfaces of the cured mat 10A due to the light color of the molding compound 14. Further, since the cured mat 10A is an exact reverse image of the interior configuration of the mold set, it can be visually inspected for mold damage at the same time as it is being visually inspected for stain and residue removal.

It will be understood that proper cleaning of a contaminated mold set may require that the above described mold cleaning operation be accomplished several times with the number of times being determined by the extent of the contamination of the particular mold set being cleaned. Complete cleaning of a mold set is easily determined. When a cured mat 10A is visually inspected and is found to be free of removed stains and residues, the particular mold cleaning operation which produced the clean cured mat 10A will be the last cleaning operation required.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A composite article for interposed placement between the parting surfaces of a mold set for cleaning contaminants from the parting and recessed surfaces thereof upon being subjected to a molding operation in the mold set, said composite article comprising:
    (a) a planar carrier sheet; and
    (b) a coating of uncured mold cleaning moldable compound on the opposed surfaces of said carrier sheet.

2. A composite article as claimed in claim 1 wherein said carrier sheet is formed of a synthetic resin of the type which provides said carrier sheet with cloth-like characteristics.

3. A composite article as claimed in claim 1 wherein said carrier sheet is a non-woven sheet formed of a synthetic resin.

4. A composite article as claimed in claim 1 wherein said carrier sheet is of non-woven polyester having cloth-like characteristics.

5. A composite article as claimed in claim 1 wherein said coating is formed of a compression grade of melamine.

6. A composite article as claimed in claim 1 wherein said coating is formed of a rapid curing, non-abrasive cellulose filled amino molding compound.

7. A composite article as claimed in claim 1 wherein said coating of mold cleaning moldable compound is of a light color.

8. A composite article as claimed in claim 1 wherein said coating of mold cleaning moldable compound is white.

9. A method of making a composite article for interposed placement between the parting surface of a mold set for cleaning contaminants from the parting and recessed surfaces thereof upon being subjected to a molding operation in the mold set, said method comprising the steps of:
    (a) mixing a slurry from a mold cleaning moldable compound and an aqueous liquid;
    (b) emersing a carrier sheet in said slurry to deposit a slurry coating of said mold cleaning moldable compound on the opposed surfaces of said carrier sheet;
    (c) sizing said carrier sheet with said slurry coating thereon to provide said slurry coating with a uniform predetermined thickness; and
    (d) drying said slurry coating subsequent to step c to complete the making of the composite article.

10. A method of making a composite article as claimed in claim 9 wherein the mold cleaning moldable compound used in step a is a compression grade of melamine.

11. A method of making a composite article as claimed in claim 9 wherein the mold cleaning moldable compound used in step a is a compression grade of melamine in granulated form.

12. A method of making a composite article as claimed in claim 9 wherein the mold cleaning moldable compound used in step a is rapid curing, non-abrasive cellulose filed amino molding compound.

13. A method of making a composite article as claimed in claim 9 wherein the mold cleaning moldable compound used in step a is a rapid curing, non-abrasive cellulose filed amino molding compound in granulated form.

14. A method of making a composite article as claimed in claim 9 wherein the mold cleaning moldable compound is of a light color.

15. A method of making a composite article as claimed in claim 9 wherein the mold cleaning moldable compound is white.

16. A method of making a composite article as claimed in claim 9 wherein said slurry of step a is mixed in proportions of approximately 50% mold cleaning moldable compound and approximately 50% aqueous solution.

17. A method of making a composite article as claimed in claim 9 wherein said carrier sheet is formed of a synthetic resin of the type which provides said carrier sheet with cloth-like characteristics.

18. A method of making a composite article as claimed in claim 9 wherein said carrier sheet is a non-woven sheet of synthetic resin.

19. A method of making a composite article as claimed in claim 9 wherein said carrier sheet is of non-woven polyester having cloth-like characteristics.

20. A method for cleaning contamination from the parting surfaces and the recessed surfaces of a mold set comprising the steps of:
    (a) embedding a carrier sheet in a coating of uncured mold cleaning moldable compound to form an uncured mat;

(b) placing said uncured mat in an interposed position between the parting surfaces of a heated mold set to be cleaned;
(c) applying a compressive force on said mold set to exert a squeezing force on said uncured mat, said squeezing force in conjunction with the heat of said mold set causing said mold cleaning moldable compound of said uncured mat to melt and flow into conformity with the parting and recessed surfaces of said mold set;
(d) curing said mold cleaning moldable compound of said uncured mat subsequent to step c to change said uncured mat into a cured mat having the conforming configuration provided in step c; and
(e) removing said cured mat from said mold set.

21. A method as claimed in claim 20 wherein said embedding step includes the further steps of:
(a) mixing a slurry of said mold cleaning moldable compound and an aqueous liquid;
(b) emersing said carrier sheet in said slurry for embedding thereof in a slurry coating of said mold cleaning moldable compound;
(c) sizing said slurry coating in which said carrier sheet is embedded to level and provide a uniform thickness of said slurry coating; and
(d) drying said slurry coating in which said carrier sheet is embedded to complete the making of said uncured mat.

22. A method as claimed in claim 21 wherein the mold cleaning moldable compound used in the mixing of said slurry is a compression grade of melamine.

23. A method as claimed in claim 21 wherein the mold cleaning moldable compound used in the mixing of said slurry is a compression grade of melamine in granulated form.

24. A method as claimed in claim 21 wherein the mold cleaning moldable compound used in the mixing of said slurry is a rapid curing, non-abrasive cellulose filled amino molding compound.

25. A method as claimed in claim 21 wherein the mold cleaning moldable compound used in the mixing of said slurry is a rapid curing, non-abrasive cellulose filed amino molding compound in granulated form.

26. A method as claimed in claim 21 wherein the mold cleaning moldable compound is of a light color.

27. A method as claimed in claim 21 wherein the mold cleaning moldable compound is white.

28. A method as claimed in claim 21 wherein said slurry is mixed in the approximate proportions of 50% of the mold cleaning moldable compound and 50% of the aqueous solution.

29. A method as claimed in claim 20 wherein the embedded carrier sheet is formed of a synthetic resin of the type which provides said carrier sheet with cloth-like characteristics.

30. A method as claimed in claim 20 wherein the embedded carrier sheet is a non-woven sheet of synthetic resin.

31. A method as claimed in claim 20 wherein the embedded carrier sheet is of non-woven polyester having cloth-like characteristics.

* * * * *